United States Patent

Griffioen et al.

[11] Patent Number: 5,950,298
[45] Date of Patent: Sep. 14, 1999

[54] METHOD FOR INSERTING A CABLE-LIKE ELEMENT INTO A TUBE COILED IN OR ON A HOLDER

[75] Inventors: Willem Griffioen, Ter Aar, Netherlands; Gerard Plumettaz, Bex, Switzerland; Arie Van Wingerden, An Delft, Netherlands

[73] Assignee: Koninklijke KPN N.V., Groningen, Netherlands

[21] Appl. No.: 08/985,092

[22] Filed: Dec. 4, 1997

[30] Foreign Application Priority Data

Dec. 11, 1996 [EP] European Pat. Off. ............. 96203506

[51] Int. Cl.$^6$ .............................. B23P 19/04; B66F 3/24; G02B 6/44
[52] U.S. Cl. ................................. 29/433; 29/819; 29/821; 29/241; 254/134.4; 254/134.3 FT; 242/54 R; 385/134
[58] Field of Search ............................... 29/821, 868, 241, 29/728, 819, 433; 254/134.4, 134.3 FT, 134.3 R; 385/100, 103, 134

[56] References Cited

U.S. PATENT DOCUMENTS

| | | |
|---|---|---|
| 3,778,878 | 12/1973 | Bindari . |
| 3,840,972 | 10/1974 | El Bindari . |
| 4,266,709 | 5/1981 | Kruger . |
| 4,332,436 | 6/1982 | Adorni et al. . |
| 4,793,048 | 12/1988 | Kashiwaya et al. . |
| 4,802,270 | 2/1989 | Kashiwaya et al. . |
| 4,850,569 | 7/1989 | Griffioen et al. . |

(List continued on next page.)

FOREIGN PATENT DOCUMENTS

| | | |
|---|---|---|
| 0 091 717 | 10/1983 | European Pat. Off. . |
| 0 108 590 | 5/1984 | European Pat. Off. . |
| 0 279 006 | 8/1988 | European Pat. Off. . |
| 0 292 037 | 11/1988 | European Pat. Off. . |
| 0 354 295 | 2/1990 | European Pat. Off. . |
| 1-65516 | 3/1989 | Japan . |
| 1-65517 | 3/1989 | Japan . |
| 2-48605 | 2/1990 | Japan . |

OTHER PUBLICATIONS

Patent Abstracts of Japan, vol. 18, No. 557, JP–6201960, Jul. 1994.

Patent Abstracts of Japan, vol. 14, No. 214, JP–2048605, Feb. 1990.

Patent Abstracts of Japan, vol. 12, No. 494, JP–63205622, Aug. 1988.

*Primary Examiner*—David P. Bryant
*Assistant Examiner*—John Preta
*Attorney, Agent, or Firm*—Frishauf, Holtz, Goodman, Langer & Chick, P.C.

[57] ABSTRACT

A cable (5) is inserted in a tube (2) wound on a tube reel (1). The cable is fed from a cable reel (6) through a cable-advancing unit (4) into a free inlet end (2.1) of the tube (2). Compressed air is applied to an air inlet (8) of the advancing unit (4), and led through the tube along the cable already inserted in the tube. The tube reel is put on a support 7, which is driven to a periodic movement in the vertical direction between to extreme positions (amplitude A, period P). During part of each period the movement is a free fall, or at least approximates a free fall. The movement may be sinusoidal with period $P=2\pi[A/g]^{1/2}$ (g is gravitational constant). In this case, the support (7) may be part of a rotatably supported lever, or may be part of a seesaw. In addition, the movement may be the vertical component of a maintained swinging movement. In this case the support (7) may be the swinging part of a Chinese swing.

16 Claims, 3 Drawing Sheets

U.S. PATENT DOCUMENTS

| | | |
|---|---|---|
| 4,887,354 | 12/1989 | Van Der Maaden . |
| 4,934,662 | 6/1990 | Griffioen et al. . |
| 4,953,827 | 9/1990 | Araki et al. . |
| 5,011,332 | 4/1991 | Kunze et al. . |
| 5,046,674 | 9/1991 | Kolschbach et al. . |
| 5,048,798 | 9/1991 | Araki et al. . |
| 5,058,259 | 10/1991 | Araki et al. . |
| 5,118,226 | 6/1992 | Horii et al. . |
| 5,245,740 | 9/1993 | Araki et al. . |
| 5,429,194 | 7/1995 | Nice . |
| 5,503,370 | 4/1996 | Newman et al. . |
| 5,573,225 | 11/1996 | Boyle et al. . |
| 5,599,004 | 2/1997 | Newman et al. . |
| 5,699,996 | 12/1997 | Boyle et al. . |

METHOD FOR INSERTING A CABLE-LIKE ELEMENT INTO A TUBE COILED IN OR ON A HOLDER

BACKGROUND OF THE INVENTION

1. Field of Invention

The invention is in the field of cable-like elements in protective tubes. More particularly the invention concerns a method for inserting a cable-like element in an elongate tube-like member which is in a coiled state in or on a holder, using the fluid drag of a medium flowing through the tube-like member in the direction of insertion along the cable-like element already inserted in the tube-like member, and subjecting the holder together with the tube to a periodic movement including a vertical component.

2. Prior Art

Inserting cable-like elements, such as optical cables or electric wire cables, in protective tubes using the drag of a fluid flowing along the cable-like element in the tube is a generally known technique. Not only for installing cables in pre-laid tubes or ducts, but also for the manufacturing of cables, especially optical fibre cables. Using the fluid drag of a gaseous medium for installing flexible fibre bundles in small bores has been disclosed in EP-A-0108590. In addition, using the fluid drag of a gaseous medium for installing cables in tubes has been disclosed in EP-A-0292037. Further the insertion of an optical fiber in a metal tube in a coiled state by using the drag of a liquid as a production step in manufacturing an optical fibre cable is known from U.S. Pat. No. 4,332,436.

Prefab (factory) installation of a cable in a tube is in many cases less expensive than installation in the field. Extrusion of a tube around a cable is one way to do this. In this it is not always possible to avoid unwanted effects, such as tacking of the tube to the cable. Insertion of a cable in a tube is another way. Therein it will be practical to keep the tube on the reel. Insertion by means of pulling is not suitable, since a tube on a reel makes up an extremely tortuous path along which the cable should be pulled. Consequently the effect of fluid drag of a gaseous or a liquid medium may be used, possibly in combination with pushing. However the insertion lengths which can thus be reached over such a tortuous path are rather limited. To be a suitable manufacturing step insertion lengths of one kilometer and more should be achieved.

A much different technique for inserting a cable-like element in a tube coiled round a reel is known from EP-A-0091717 and EP-A-0279006. According to this known technique the reel is, with its axis vertically, subjected to a periodic movement, in which the tube returns periodically to its initial position. According to EP-A-0091717 the element moves in the tube, i.e. a bore or a channel in a carrier member such as a ribbon, as a result of the periodic movement and its mass of inertia. Periodic movements which are vibratory and/or pulsatory or shaking, are disclosed, in which the, preferably harmonic, vibrating movement has a relative small inclination angle to the longitudinal direction of the tube. Reference EP-A-0279006 discloses a similar technique in which the periodic movement is a so called helical vibration, i.e. a movement with a small vertical component and a longer longitudinal component in a screw-thread manner. Thus in both of these known insertion methods the cable-like element is vibrated forwardly along the curved path of the tube. Therein the longitudinal component of the vibration may provide a small advancing force, whereas simultaneously the vertical component may provide a momentary reduction of the friction between the cable-like element and the inner surface of the tube. In order to be effective, however, the vibrations should have a relative large frequency and a relative small amplitude. Consequently it is necessary that the tubes are well fixed to the reel, which needs special techniques and may cause extra labour, e.g. extra spooling of the tube on a special reel. Moreover a minimum diameter of the tube with respect to the diameter of the cable-like element is required for these known methods to be effective.

EP-A-0354295 describes a technique similar as known from EP-A-0279006, in which additionally during the periodic movement a stream of pressurized gas is passed over the cable-like element in the tube in order to provide an advancing force on the cable-like element in the longitudinal direction of the tube. Although an improvement may be achieved as a consequence of the additional advancing force, this known insertion technique mainly has similar drawbacks as the previously discussed technique of EP-A-0091717 and EP-A-0279006.

SUMMARY OF THE INVENTION

The object of the invention is to provide a method for inserting a cable-like element in a coiled tube, which avoids the mentioned drawbacks of the cited prior art. The object is achieved by using the fluid drag of a flowing medium in the coiled tube in combination with a specific periodic movement of the coiled tube. The specific periodic movement is such that during (a part of) each period the coiled tube is subjected to a movement which approaches as good as possible a free fall movement. In this it has been considered that a first body within a larger second body, during a free fall of both bodies, does not exert any forces on the inner wall of the second body, i.e. the first body is floating with respect to the second body. Consequently the specific periodic movement is determined by the prevailing gravitation constant (g) at least with respect to its period. During such a free fall movement of the coiled tube the cable-like element will be in such a floating state, and will be subjected only to the fluid drag, over the whole length already inserted in the tube. Thus during the free fall the element may be advanced in principle without experiencing any friction with the inner surface of the tube.

Based on these considerations the method according to the invention comprises the steps of:

feeding a free end and following portions of the cable into a free end of the tube, bringing about a flow of a fluid through the tube in the direction of feeding along the cable already inserted in the tube for causing a fluid drag on the cable in the tube, and subjecting the holder together with the tube to a periodic movement including a vertical component with a period which is dependent on the prevailing gravitation constant for bringing about a free-fall movement of the cable in the tube during each period, at least approximately.

In a first preferred embodiment of the method, the vertical periodic movement is sinusoidal with amplitude A and period P, and the period and the amplitude, and the gravitational constant g are related to each other according to the expression: $P=2\pi[A/g]^{1/2}$, at least approximately.

In a second preferred embodiment of the method, the periodic movement is a maintained swinging movement, including a vertical and a horizontal component having an amplitude-ratio of at least one half. The first as well as the second embodiment has the advantage that much larger amplitudes may be used than applied for the vibrations of the concerned prior art discussed above. This eliminates the need to tightly attach or retain the tube on or in the holder. Moreover a tube diameter may be chosen closer to the cable diameter. But, even more important, the corresponding longer free fall periods allow the cable more time to accelerate, which makes the insertion more effective.

Preferably the fluid drag of a gaseous medium such as compressed air is used.

The holder may be a reel on which the tube has been wound, or a container in which the tube is in a restrained state.

INCORPORATION BY REFERENCE

The entire contents of all references mentioned hereinabove, including EP-A-0108590, EP-A-0292037, U.S. Pat. No. 4,332,436, EP-A-0091717, EP-A-0279006, and EP-A-0354295, are incorporated in the present application by reference.

BRIEF DESCRIPTION OF THE DRAWINGS

The invention will be explained in greater detail by means of a description of an exemplary embodiment, with reference being made to the following figures.

DETAILED DESCRIPTION

It will be appreciated that the described method is applicable for the insertion of any cable-like element, be it a cable, an optical fiber or a wire, or even a rope, in any elongate hollow member, be it tube-like or a body provided with a bore or a channel, through which a fluid can flow. Hereinafter a cable-like element is called cable, and the elongate holow member is called tube, for short.

Although the described method may be carried out by using the fluid drag of a streaming liquid, the described embodiments will show the use of a gaseous medium such as compressed air only, since in most applications this will be the most practical way. Using the fluid drag of compressed air will be called blowing for short. The tube in which the cable is inserted is wound on a reel only by way of an example. The presented method, however, will be also applicable to a tube stored in a container, torsion-free coiled or not, in a retained way. As part of the method the tube on the reel is subjected to a specific periodic movement, hereinafter called oscillation, in a mainly vertical direction, as described below.

Figure 1:
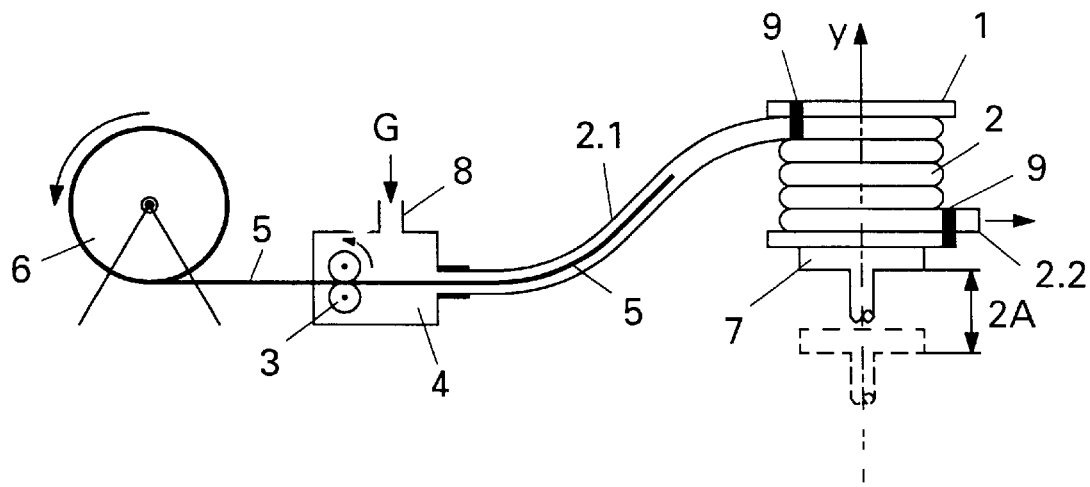
FIG. 1 shows a first embodiment of the method according to the invention.

Now the method is described in its most elementary form with reference to FIG. 1. FIG. 1 shows schematically a tube reel 1 on which a tube 2 has been wound. The tube may be wound around the reel in a number of layers, depending on the length of the tube and the diameters of the tube and the reel. A free end, inlet end 2.1 of the tube is, possibly via a suitable coupling piece, coupled to a cable-advancing unit 4, known as such EP-A-0108590, EP-A-0292037 cited hereinabove. A cable 5 is fed from a cable reel 6 through the cable-advancing unit 4 into the inlet end 2.1 of the tube. The tube reel 1 is releasably mounted, with its axis y vertically, on a support 7. The support 7 is drivable (driving means not shown) to oscillate in the vertical direction between two extreme positions, a distance 2A apart. To start the insertion method, compressed air (arrow G) is applied to an air inlet 8 of the advancing unit 4, flows through the tube and out at an outlet and 2.2 of the tube 2. Then the cable is blown into the tube, and simultaneously the support 7 is driven to oscillate. Clamping parts 9 void the tube 2 to unwind at the inlet end 2.1 and the outlet end 2.2 of the tube.

The oscillating movement of the support 7, and together with the support also the reel with the tube in which the cable is being blown, is such that it is, as much as possible, "tuned to gravity", i.e. a free fall is part of the oscillating movement, e.g. during half of the period. Only then the part of the cable, which is already in the tube, comes loose from the inner surface of the tube for a non-negligible length of time. During this length of time the cable, which is blown forward in the tube, will experience no friction with the inner surface of the tube. Because in the oscillating movement the cable must be accelerated from standstill every period, this zero-friction part of the oscillational period must be long enough for the advancing working of the fluid drag to result in reasonable insertion speeds. Hence sufficiently long oscillation periods are required. As a consequence relative large oscillation amplitudes must be used, i.e. much larger than the diameter of the tube. This has the advantage that no special tight fixing of the tube to the reel is required. Note that too "strong" vibration (i.e. high acceleration) may even result in a negative effect. E.g in case of a vertical oscillation during which an acceleration occurs of more than two times the gravitational acceleration, the cable will rattle up and down in the tube at irregular positions, and moreover will locally experience, during each period, friction forces of up to more than three times its normal value, i.e. without oscillation.

Figure 2:
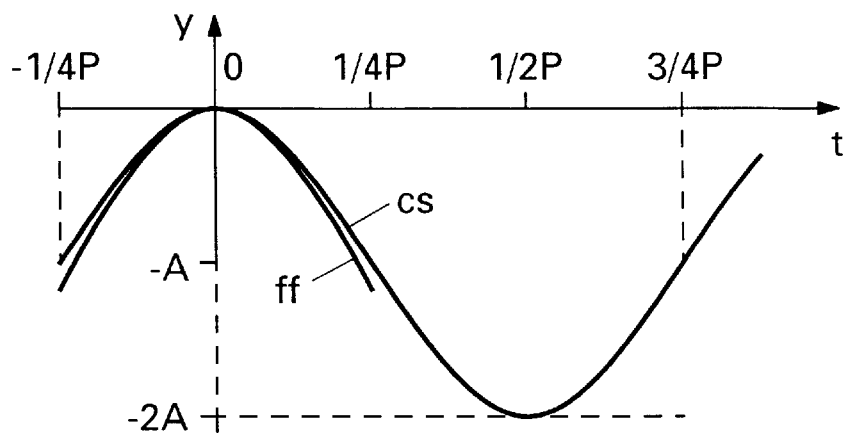
FIG. 2 shows a graphic representation of a vertical sinusoidal movement used in the embodiment of FIG. 1.

A first specific oscillation is described with reference to FIG. 2 and is based on the consideration that a vertical sinusoidal oscillation is relative easy to realize in practice. In order to make calculations somewhat simpler, this sinusoidal oscillation will be described by a "cosine minus one"

function. FIG. 2 shows schematically a part cs of this function with an amplitude A, a period P, and having a top at the origin 0. In a top region r for time t between $-\frac{1}{4}P \leq t \leq +\frac{1}{4}P$ the "free-fall condition" will be met, at least approximately.

For an amplitude A and a period P the position in a vertical y-direction as a function of time t will be:

$$y = A[\cos(2\pi t/P) - 1] \quad (1)$$

This can be approximated at its top by:

$$y = -\frac{1}{2}A[2\pi/P]^2 t^2 \quad (2)$$

For a free gravitational fall, with the gravitational constant g, a similar expression is found:

$$y = -\frac{1}{2}g t^2 \quad (3)$$

Matching the two results of the expressions (2) and (3) in the condition for gravitational tuning, the following approximate expression is found for the period:

$$P = 2\pi[A/g]^{1/2} \quad (4)$$

Curve ff in the figure represents the free fall movement according to expression (3) using the period P of expression (4) in the top region r. In this top region the sinusoidal oscillation cs and the free fall curve f match pretty well, i.e. over the entire half (positive) part of the oscillation period P. During the other half of the period the effect will be opposite, i.e. a double gravity is experienced. This means that the advancing movement of the cable as result of the fluid drag working during the zero-friction part of the period will be decreased (rather) strongly, possibly even to a standstill. This will be no problem, since such a decrease will occur over the whole length of the cable in the tube simultaneaously. Assume a standstill will occur. During the next period the cable will be accelerated by the fluid drag working again from standstill to a certain maximum speed $v_m$ in the free-fall half period, and will be decelerated to a standstill again in the other half period. The average speed of the cable will be in between the values $v_m/4$ and $v_m/2$ (see below).

Assume now a cable with weight W per unit of length and diameter $D_c$ which must be inserted into a tube with (inner) diameter $D_t$ and length L. The friction coefficient between cable and tube is f. The drag force per unit of length $dF_d/dx$ at the inlet end 2.1 of the tube (i.e. for x=0, where $0 \leq x \leq L$ is taken along the path of the tube) may be expressed (see e.g. EP-A-0292037 cited hereinabove) by:

$$[dF_d/dx]_{x=0} = \frac{1}{4}\pi D_c D_t \cdot \frac{1}{2}(p_0^2 - p_1^2)(Lp_0)^{-1} \quad (5)$$

$$z \text{ (per definition)} \quad (5')$$

In this expression $P_0$ is the (absolute) pressure at the inlet end 2.1 of the tube, and $P_L$ is the (absolute) pressure at the outlet end 2.2 of the tube, usually atmospheric. This drag force determines the advancement of the cable in the tube, and has, seen over the total length L of the tube, the smallest value (z) at the inlet end 2.1 of the tube. Assume that this force is not enough, under normal gravity, to overcome the friction force fW per unit of length. During half the period P where the free-fall condition is met, the friction force fW is zero and the acceleration a of the cable follows from expression (5') and Newton's law:

$$z = (W/g) \cdot a \quad (6)$$

This acceleration will continue over a duration P/2. Consequently, using expression (4), this will result in a maximum speed:

$$v_m = \pi (Ag)^{1/2} \cdot z W^{-1} \quad (7)$$

Analogously, it can be derived for the deceleration during the second half period, where the friction force is double, i.e. 2fW:

$$z - 2fW = (W/g) \cdot a \quad (8)$$

The time $t_d$, which it takes for the cable to decelerate from $v_m$ to a standstill, is expressed by:

$$t_d = -\frac{1}{2}P[1 - 2fW/z]^{-1} \quad (9)$$

Finally the average speed v of the cable is expressed by:

$$v = \frac{1}{2}v_m \cdot [2 - z/(fW)]^{-1} \quad (10)$$

Figure 3:
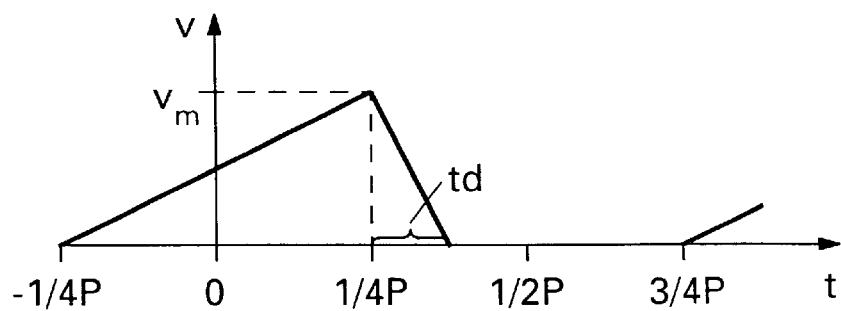
FIG. 3 shows a graphic representation of the speed of a cable-like element corresponding to the sinusoidal movement of FIG. 2.

FIG. 3 shows a graphical representation of the speed v of the tube during one period. Note that the assumption made above with respect to the value z for the drag force at the inlet end of the tube, implies that $\frac{1}{4}v_m \leq v \leq \frac{1}{2}v_m$.

EXAMPLE

The cable is a small copper quad with diameter $D_c$ of 4.5 mm and weight W of 0.2 N/m. It has to be inserted into a tube with $D_t$ of 5.5 mm and the friction coefficient f is 0.2 between the cable and the inner surface of the tube (N.B. extrusion of such a tight fitting tube around the cable, without increasing the friction coefficient to keep the ability to easily remove the cable in the future and replace it e.g. with an optical fiber, is difficult). The compressor delivers an (absolute) pressure of 9 bar. The tube is placed on a reel with a diameter of 1 m. Therefore the additional pushing, effective only over the first number of turns, does not reach very far. Blowing will result in an installation length of only 216 m, whereas much larger lengths are desired. The described method may be dimensioned for much longer length as follows. Assume, the installation length is aimed at 1000 m. The average speed, which is calculated from expression (10), is 0.28 $v_m$. Assume further, a desired insertion time of two hours. For this $v_m \approx 0.5$ m/s will be required. Now it follows from expression (7), that an amplitude $A \approx 1.36$ m is needed to give the cable enough time to accelerate. Finally a period $P \approx 2.34$ s follows from expression (4). It should be realized that a smaller amplitude corresponds to a smaller period of the oscillation, which results in a lower average speed v, and consequently in a longer installation time.

Figure 4:
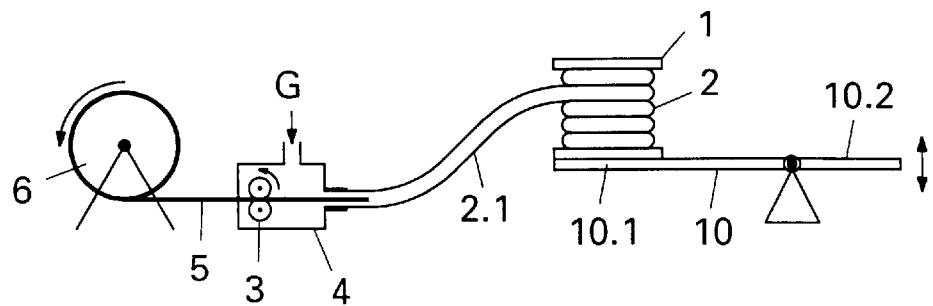
FIG. 4 shows a second embodiment of the method according to the invention.

For realizing the relative large amplitude A the reel 1 may be put, as shown in FIG. 4, on the longer arm 10.1 of a rotatably supported lever 10. The shorter arm 10.2 of the lever is driven according to the desired sinusoidal oscillation with an amplitude which is a fraction of the amplitude A corresponding to the length ratio of the two lever arms.

Figure 5:
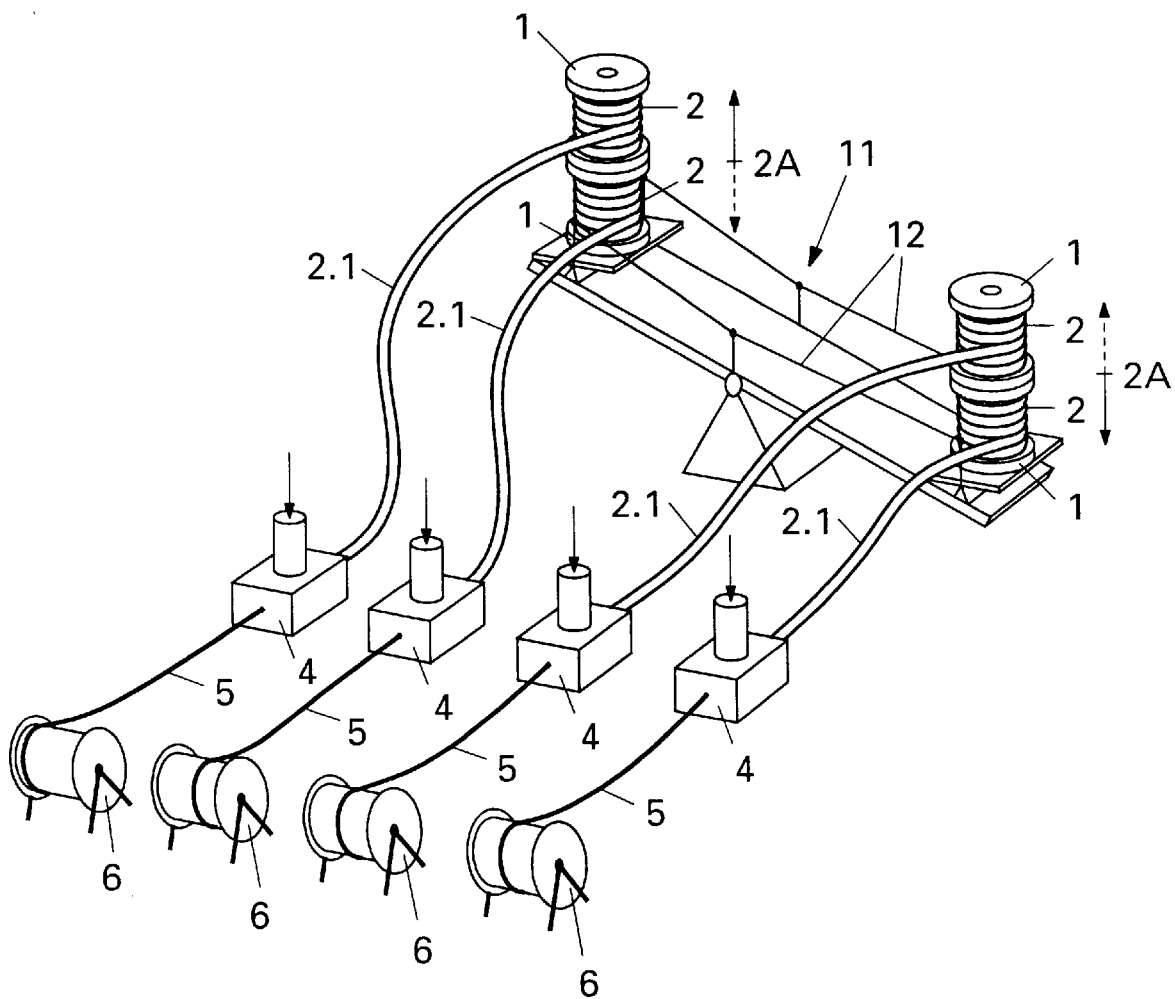
FIG. 5 shows a third embodiment of the method according to the invention.

For mass production the tubes of a plurality of reels may be provided with cables at the same time. An equal number of reels 1, e.g. two reels each as shown in FIG. 5, may be put at either side of a seesaw 11. A rod system 12 may be provided to keep the reels with their central axes vertically during the seesaw movement.

Figure 6:
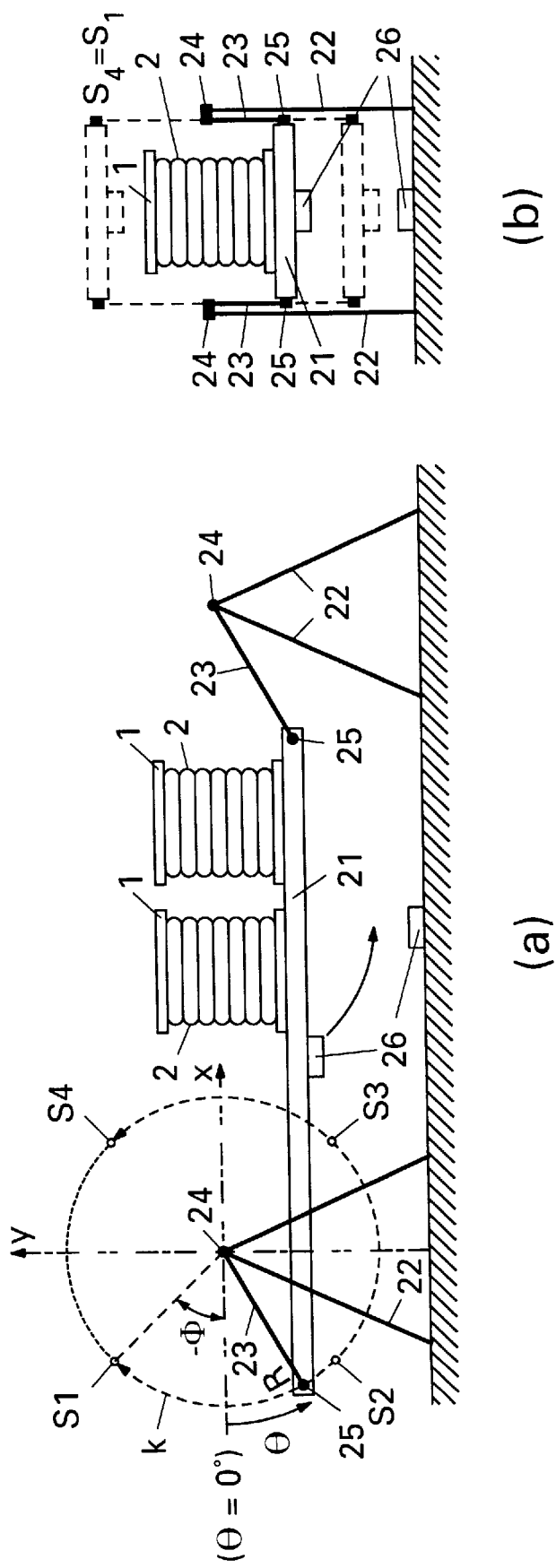
FIG. 6 shows a fourth embodiment of the method according to the invention.

A second specific oscillation is based on the periodic movement of a swinging structure which is known as "Chinese swing", and is described with reference to FIG. 6. Part (a) of FIG. 6 shows schematically the swinging structure in a front view, whereas part (b) shows the same in a side-view. In this structure a platform 21 has been swingably suspended, between two pairs of standards 22, by two pairs of rigid arms 23 of equal length R. The pairs of arms 23 extend parallelly from points of suspension 24 on equal heigth on the standards 22 to connection points 25 in which the arms are rotatably connected to the platform 21. One or more reels 1 (only two have been shown in the figure) may be put on the platform. The suspension of the platform 21 is such that it swings horizontally, and each point of the platform describes a circular path on the circumference of a circle k with radius R. For one of the connection points 25 this circle k (its centre in one of the points of suspension, is the origin of an (x,y) coordinate-system) 24 is shown in part (a) of FIG. 6. The momentary position of an arm 23 is given by an angle θ with respect to the negative x-axis (θ=0°). Four positions S1, S2, S3 and S4 are indicated for the arm 23 on the circle k, at θ=±Φ and at θ=π±Φ. The swinging movement is such that during each period P of the swinging movement the circular path is gone from the position S1 via the positions S2 and S3 to S4, and over S3 and S2 back to S1. Means are provided, e.g. magnetic means 26, for maintaining the swinging movement between the positions S1 and S4, through magnetic pulses given when the platform 21 passes its lowest position.

It can be derived that for the swinging movement the angle θ fulfills the differential equation:

$$d^2\theta/dt^2 = gR^{-1} \cos(\theta) \quad (11)$$

The swinging movement has a horizontal component, described by:

$$x = -R \cos(\theta) \quad (12)$$

with extreme values x=−R for θ=0°, and x=+R for θ=π; and a vertical component described by:

$$y = -R \sin(\theta) \quad (13)$$

with extreme values y=R sin (Φ) for θ=−Φ and θ=π+Φ, and y=−R for θ=½π. For the vertical and horizontal components an amplitude-ratio AR is defined:

$$AR = \frac{1}{2}(1 + \sin(\Phi)) \quad (14)$$

In passing the horizontal (i.e. at θ=0° and θ=π) in the up/down directions the horizontal component of the swinging movement is zero, whereas the vertical component equals momentary a free-fall movement. As long as between the positions S1 and S2 (and between S3 and S4) the vertical component is larger than the horizontal component, and centrifugal forces are relatively small, the swinging movement may be considered as being approximately a free-fall movement. In the lower part of the swinging movement between the positions S2 and S3 the centrifugal forces are relatively high, and a higher effective gravity will be experienced. Consequently, as the approximate free-fall movement should be most profitable for the insertion the positions S1 and S4 should be chosen at about θ=π/4 and θ=3π/4, i.e. at an amplitude-ratio AR=½(1+½√2). Note that the swinging movement is carrying out an approximate free-fall two times within one period (S2→S1→S2, and S3→S4→S3), and moreover during more than half of the period.

Note that in using such a swinging structure no special measures are needed for obtaining the approximate free-fall movement: No tuning of the period with respect to the amplitudes are nesessary, or "tuning goes by gravity itself". Only the magnetic "little pushing" has to be controlled in order to maintain the desired extreme values −Φ and π+Φ for the angle θ.

What is claimed is:

1. A method for inserting a cable-shaped member in a coiled, elongated tube-shaped member held by a holder, the method comprising steps of:

feeding a free end and following portions of the cable-shaped member into a free end of the tube-shaped member;

bringing about a flow of a fluid through the tube-shaped member in a direction of feeding along the portions of the cable-shaped member already inserted in the tube-shaped member so as to cause a fluid drag on the cable-shaped member in the tube-shaped member; and subjecting the holder together with the tube-shaped member to a periodic movement including a vertical component, such that the holder experiences a vertical acceleration which is substantially equal to the acceleration of gravity g during a substantial part of each period of the periodic movement, the period being larger than one second, and the amplitude of the vertical component of the periodic movement being substantially larger than a diameter of the tube-shaped member.

2. The method according to claim 1, wherein the vertical acceleration of the holder during at least about half of the period is at least approximately equal to the acceleration of gravity g.

3. The method according to claim 1, wherein the vertical component of the periodic movement is sinusoidal with amplitude A and period P, the period P, the amplitude A, and the acceleration of gravity g being related to each other such that P is approximately equal to $2\pi[A.g]^{1/2}$.

4. The method according to claim 3, wherein the holder is positioned on a first arm of a seesaw, and the seesaw is driven according to the sinusoidal vertical component of the periodic movement.

5. The method according to claim 4, wherein a second holder with a second coiled tube-shaped member is positioned on a second arm of the seesaw, and a second cable-shaped member is inserted in the second tube-shaped member during the movement of the seesaw.

6. The method according to claim 4, wherein the holder is positioned on a longer arm of a rotatably supported lever, and a shorter arm of the lever is driven according to the sinusoidal vertical component of the periodic movement with an amplitude which is a fraction of the amplitude A corresponding to a length ratio of the shorter and the longer arms of the lever.

7. The method according to claim 4, wherein the holder comprises a reel on which the tube-shaped member has been coiled.

8. The method according to claim 4, wherein the holder comprises a container in which the tube-shaped member is inserted in a restrained state.

9. The method according to claim 1, wherein the periodic movement comprises a maintained swinging movement, including a vertical and a horizontal component having an amplitude-ratio of at least one half.

10. The method according to claim 9, wherein the vertical and horizontal components of the swinging movement have an amplitude-ratio of about $\frac{1}{4}(2+\sqrt{2})$.

11. The method according to claim 10, wherein the holder is positioned on a horizontal platform which is a swinging part of a swinging structure known as "Chinese swing", and the platform is subjected to said maintained swinging movement.

12. The method according to claim 9, wherein the holder is positioned on a horizontal platform which is a swinging part of a swinging structure known as "Chinese swing", and the platform is subjected to said maintained swinging movement.

13. The method according to claim 9, wherein the holder comprises a reel on which the tube-shaped member has been coiled.

14. The method according to claim 9, wherein the holder comprises a container in which the tube-shaped member is inserted in a restrained state.

15. The method according to claim 1, wherein the holder comprises a reel on which the tube-shaped member has been coiled.

16. The method according to claim 1, wherein the holder comprises a container in which the tube-shaped member is inserted in a restrained state.

* * * * *